(12) United States Patent
Zhou (10) Patent No.: US 11,716,672 B2
(45) Date of Patent: Aug. 1, 2023

(54) DATA TRANSMISSION METHOD, DEVICE, GATEWAY AND STORAGE MEDIUM FOR MESH NETWORK

(71) Applicant: SHENZHEN CHUANGWEI-RGB ELECTRONICS CO., LTD., Shenzhen (CN)

(72) Inventor: Hongyu Zhou, Shenzhen (CN)

(73) Assignee: SHENZHEN CHUANGWEI-RGB ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 17/253,985

(22) PCT Filed: Oct. 30, 2020

(86) PCT No.: PCT/CN2020/125547
§ 371 (c)(1),
(2) Date: Dec. 18, 2020

(87) PCT Pub. No.: WO2021/196589
PCT Pub. Date: Oct. 7, 2021

(65) Prior Publication Data
US 2022/0053407 A1 Feb. 17, 2022

(30) Foreign Application Priority Data
Apr. 2, 2020 (CN) .......................... 202010257878.9

(51) Int. Cl.
*G06F 15/16* (2006.01)
*H04W 40/22* (2009.01)
(Continued)

(52) U.S. Cl.
CPC ............. *H04W 40/22* (2013.01); *H04L 45/20* (2013.01); *H04L 45/54* (2013.01); *H04L 45/70* (2013.01); *H04W 84/18* (2013.01)

(58) Field of Classification Search
CPC ......... H04L 45/20; H04L 45/54; H04L 45/70; H04W 40/22; H04W 84/18
See application file for complete search history.

(56) References Cited

U.S. PATENT DOCUMENTS

| 7,715,395 B2 * | 5/2010 | Ginchereau ........... H04W 40/02 |
| | | 370/392 |
| 2006/0153206 A1 * | 7/2006 | Erwin .................... H04L 45/123 |
| | | 709/241 |

(Continued)

FOREIGN PATENT DOCUMENTS

| CN | 101883048 A | 11/2010 |
| CN | 103596240 A | 2/2014 |

(Continued)

OTHER PUBLICATIONS

First office action dated Mar. 1, 2021 issued by CNIPA for the counterpart Chinese patent application No. CN 2020102578789, along with English translation.

(Continued)

*Primary Examiner* — Oleg Survillo
(74) *Attorney, Agent, or Firm* — Platinum Intellectual Property PC (57) ABSTRACT

The present disclosure provides a data transmission method for Mesh network, a data transmission apparatus for Mesh network, a gateway and a storage medium, belonging to technical field of wireless communications. The method includes: parsing data to be transmitted sent from a source device to obtain an identifier of a target device of the data to be transmitted; querying, according to the identifier of the target device, an optimal path from the gateway to the target device from the preset routing table; and sending the data to be transmitted and the optimal path to a relay device connected to the gateway on the optimal path.

16 Claims, 4 Drawing Sheets

(51) Int. Cl.
*H04L 45/00* (2022.01)
*H04W 84/18* (2009.01)

(56) References Cited

U.S. PATENT DOCUMENTS

| | | | | |
|---|---|---|---|---|
| 2007/0115998 | A1* | 5/2007 | McElligott | H04L 45/02 370/392 |
| 2008/0025225 | A1* | 1/2008 | Kanno | H04L 49/555 370/395.31 |
| 2008/0247400 | A1 | 10/2008 | Schoettle | |
| 2009/0154423 | A1* | 6/2009 | Song | H04W 48/18 370/331 |
| 2010/0046396 | A1* | 2/2010 | Cai | H04W 24/02 370/254 |
| 2010/0054155 | A1* | 3/2010 | Cai | H04B 7/2606 370/254 |
| 2011/0299406 | A1* | 12/2011 | Vobbilisetty | H04L 43/10 370/248 |
| 2012/0113966 | A1* | 5/2012 | Tao | H04L 12/12 370/338 |
| 2014/0129735 | A1 | 5/2014 | Thyni et al. | |
| 2014/0172981 | A1* | 6/2014 | Kim | H04L 45/16 709/204 |
| 2015/0016459 | A1* | 1/2015 | Lee | H04L 45/745 370/392 |
| 2015/0236944 | A1* | 8/2015 | Kano | H04L 45/20 370/401 |
| 2018/0018222 | A1* | 1/2018 | Baptist | H03M 13/3761 |
| 2018/0109966 | A1* | 4/2018 | Alexander | H04W 24/04 |
| 2018/0220480 | A1* | 8/2018 | Agiwal | H04W 24/08 |
| 2018/0278514 | A1* | 9/2018 | Chadha | H04L 43/10 |
| 2018/0337839 | A1* | 11/2018 | Bristow | H04L 12/4633 |
| 2019/0174329 | A1 | 6/2019 | Keating et al. | |
| 2019/0280941 | A1* | 9/2019 | Barnes | H04L 47/286 |
| 2020/0226935 | A1* | 7/2020 | Okamura | H04W 52/18 |
| 2020/0288373 | A1* | 9/2020 | Kharvar | H04W 40/02 |
| 2021/0111995 | A1* | 4/2021 | Arora | H04L 45/20 |
| 2021/0160756 | A1* | 5/2021 | Kimura | H04L 63/0892 |
| 2021/0274424 | A1* | 9/2021 | Bartell | H04W 40/248 |

FOREIGN PATENT DOCUMENTS

| | | |
|---|---|---|
| CN | 103686799 A | 3/2014 |
| CN | 107027162 A | 8/2017 |
| CN | 107409092 A | 11/2017 |
| CN | 108432192 A | 8/2018 |
| CN | 108521381 A | 9/2018 |
| CN | 109688613 A | 4/2019 |
| CN | 111614557 A | 9/2020 |

OTHER PUBLICATIONS

First Search Report of the counterpart Chinese patent application No. CN 2020102578789.
International Search Report of counterpart PCT application No. PCTCN2020125547 dated Jan. 28, 2021.
Written Opinion of the ISA for the counterpart PCT application No. PCTCN2020125547 dated Jan. 28, 2021.

* cited by examiner

DATA TRANSMISSION METHOD, DEVICE, GATEWAY AND STORAGE MEDIUM FOR MESH NETWORK

The present disclosure claims the priority to the Chinese patent application with the filing No. 2020102578789 filed on Apr. 2, 2020 with the Chinese Patent Office, and entitled "Data Transmission Method, Device, Gateway and Storage Medium for Mesh Network", the contents of which are incorporated herein by reference in entirety.

TECHNICAL FIELD

The present disclosure relates to the technical field of wireless communications, in particular, to a data transmission method for Mesh network, a data transmission apparatus (a device) for Mesh network, a gateway and a storage medium.

BACKGROUND ART

With the continuous promotion of the Mesh (Wireless Mesh Network) network and the popularization of the Internet of Things (IoT), more and more IoT devices start to use the Mesh network for networking and communication, and the Mesh network includes a plurality of devices.

In the prior art, during data transmission of Mesh network, a routing table is pre-established in each device, the routing table stored in each device indicates information of other devices that a current device may reach, and when a certain device receives target data from the Mesh network, it is judged whether a target device exists in the routing table of the current device, wherein if yes, the target data is sent to the target device, and if not, other device information is acquired from the routing table, and the target data is sent to other devices until the target device receives the target data.

However, each device merely stores information of other devices that the current device may reach, and each device needs to judge whether the target device is in the routing table of the current device, then a large amount of time is wasted, resulting in low transmission efficiency of data.

SUMMARY

Embodiments of the present disclosure are implemented as follows.

In one aspect, an embodiment of the present disclosure provides a data transmission method for Mesh network, including:

parsing data to be transmitted sent from a source device to obtain an identifier of a target device of the data to be transmitted;

querying, according to the identifier of the target device, an optimal path from the gateway to the target device from the preset routing table, wherein the preset routing table includes the optimal path from the gateway to at least one data receiving device; and sending the data to be transmitted and the optimal path to a relay device connected to the gateway on the optimal path, so that the relay device transmits the data to be transmitted to the target device based on the optimal path.

In an optional embodiment, before the querying, according to the identifier of the target device, an optimal path from the gateway to the target device from the preset routing table, the method further includes:

sending a routing establishment message to each relay device connected to the gateway, so that each relay device sends a routing request message to the target device;

monitoring receipt feedback from the target device, and determining a target TTL value corresponding to the target device according to a monitoring result;

determining, according to the target TTL value, a target relay device corresponding to the target device from the relay devices satisfying the target TTL value; and establishing, according to the target relay device, the optimal path from the gateway to the target device.

In an optional embodiment, the step of sending a routing establishment message to each relay device connected to the gateway includes:

sending the routing establishment message to each relay device connected to the gateway according to a preset Time To Live TTL value; and the step of monitoring receipt feedback from the target device, and determining a target TTL value corresponding to the target device according to a monitoring result includes:

adjusting the TTL value according to the monitoring result;

re-sending the routing establishment message to each relay device connected to the gateway according to the adjusted TTL value, until the monitoring result satisfies the preset requirement; and determining the TTL value corresponding to the monitoring result as the target TTL value when the preset requirement is satisfied.

In an optional embodiment, the preset Time To Live TTL value is a preset minimum TTL value; and the step of adjusting the TTL value according to the monitoring result includes:

increasing the TTL value according to a preset amplitude of adjustment if the monitoring result indicates that the receipt feedback from the target device is not received, wherein the preset requirement is that the receipt feedback from the target device is received.

In an optional embodiment, the preset Time To Live TTL value is a preset maximum TTL value; and the step of adjusting the TTL value according to the monitoring result includes:

decreasing the TTL value according to a preset amplitude of adjustment if the monitoring result indicates that the receipt feedback from the target device is received, wherein the preset requirement is that the receipt feedback from the target device is not received.

In an optional embodiment, the step of determining, according to the target TTL value, a target relay device corresponding to the target device from the relay devices satisfying the target TTL value includes:

determining transmission characteristic parameters of each relay device among the relay devices satisfying the target TTL value; and determining the target relay device from the relay devices satisfying the TTL value corresponding to the target device according to the transmission characteristic parameters.

In an optional embodiment, the transmission characteristic parameters include: a received signal strength indication RSSI value and/or a transmission delay to the target device.

In an optional embodiment, the step of determining the target relay device from the relay devices satisfying the TTL value corresponding to the target device according to the transmission characteristic parameters includes:

determining, from the relay devices satisfying the TTL value corresponding to the target device, the relay device having the highest received signal strength indication RSSI value as the target relay device.

In an optional embodiment, the step of determining the target relay device from the relay devices satisfying the TTL value corresponding to the target device according to the transmission characteristic parameters includes:

determining, from the relay devices satisfying the TTL value corresponding to the target device, the relay device having the shortest transmission delay to the target device as the target relay device, if the received signal strength indication RSSI values of the relay devices satisfying the TTL value corresponding to the target device are equal.

In an optional embodiment, the method includes:

determining, if it is detected that there is a disconnected relay device between the gateway and the target device, a candidate relay device from other relay devices with the same TTL value as that of the disconnected relay device;

sending a routing updating message to the target device using the candidate relay device; and updating, if the feedback from the target device is received, the disconnected relay device in at least one path in the preset routing table as the candidate relay device In an optional embodiment, before the step of determining, if it is detected that there is a disconnected relay device between the gateway and the target device, a candidate relay device from other relay devices with the same TTL value as that of the disconnected relay device, the method further includes:

detecting heartbeat of the relay device; and determining that there is a disconnected relay device between the gateway and the target device if no heartbeat of the relay device is detected.

In another aspect, an embodiment of the present disclosure further provides a data transmission apparatus for Mesh network, wherein the apparatus includes:

a parsing module, configured to parse data to be transmitted sent from a source device to obtain an identifier of a target device of the data to be transmitted;

a querying module, configured to query, according to the identifier of the target device, an optimal path from a gateway to the target device from a preset routing table, wherein the preset routing table includes the optimal path from the gateway to at least one data receiving device; and a sending module, configured to send the data to be transmitted and the optimal path to the relay device connected to the gateway on the optimal path, so that the relay device transmits the data to be transmitted to the target device based on the optimal path.

In an optional embodiment, the sending module is further configured to send a routing establishment message to each relay device connected to the gateway, so that each relay device sends a routing request message to the target device.

The apparatus further includes:

a determining module, configured to monitor receipt feedback from the target device, and determine a target TTL value corresponding to the target device according to a monitoring result; and determine, according to the target TTL value, a target relay device corresponding to the target device from the relay devices satisfying the target TTL value; and an establishing module, configured to establish, according to the target relay device, the optimal path from the gateway to the target device.

In an optional embodiment, the sending module is further configured to send a routing establishment message to each relay device connected to the gateway according to a preset Time To Live TTL value.

The determining module is specifically configured to adjust the TTL value according to the monitoring result; and re-send the routing establishment message to each relay device connected to the gateway according to the adjusted TTL value until the monitoring result satisfies the preset requirement; and determine the TTL value corresponding to the monitoring result as the target TTL value when the preset requirement is satisfied.

In an optional embodiment, the determining module is specifically configured to increase the TTL value according to a preset amplitude of adjustment if the monitoring result indicates that the receipt feedback from the target device is not received, wherein the preset requirement is that the receipt feedback from the target device is received.

In an optional embodiment, the determining module is specifically configured to decrease the TTL value according to the preset amplitude of adjustment, if the monitoring result indicates that the receipt feedback from the target device is received, wherein the preset requirement is that the receipt feedback from the target device is not received.

In an optional embodiment, the determining module is specifically configured to determine transmission characteristic parameters of each relay device among the relay devices satisfying the target TTL value; and determine the target relay device from the relay devices satisfying the TTL value corresponding to the target device according to the transmission characteristic parameters.

In an optional embodiment, the transmission characteristic parameters include: a received signal strength indication RSSI value and/or a transmission delay to the target device.

In an optional embodiment, the determining module is configured to determine, from the relay devices satisfying the TTL value corresponding to the target device, the relay device having the highest received signal strength indication RSSI value as the target relay device.

In an optional embodiment, the determining module is configured to determine, from the relay devices satisfying the TTL value corresponding to the target device, the relay device having the shortest transmission delay to the target device as the target relay device, if the received signal strength indication RSSI values of the relay devices satisfying the TTL value corresponding to the target device are equal.

In an optional embodiment, the determining module is configured to determine, if it is detected that there is a disconnected relay device between the gateway and the target device, a candidate relay device from other relay devices with the same TTL value as that of the disconnected relay device.

The sending module is further configured to send a routing updating message to the target device using the candidate relay device.

The apparatus further includes:

an updating module, configured to update, if the feedback from the target device is received, the disconnected relay device in at least one path in the preset routing table as the candidate relay device.

In an optional embodiment, the determining module is further configured to detect heartbeat of the relay device.

The determining module is further configured to determine that there is a disconnected relay device between the gateway and the target device if no heartbeat of the relay device is detected.

An embodiment of the present disclosure further provides a gateway, including a memory and a processor, wherein the memory stores a computer program executable on the processor, and when the processor executes the computer program, the steps of the data transmission method for Mesh network according to the first aspect above are realized.

An embodiment of the present disclosure further provides a storage medium, wherein the storage medium stores a computer program, and when the computer program is executed by a processor, the steps of the data transmission method for Mesh network according to the first aspect above are executed.

Beneficial effects of the embodiments of the present disclosure include:

to sum up, the embodiments of the present disclosure provide a data transmission method for Mesh network, a data transmission apparatus for Mesh network, a gateway and a storage medium, wherein the identifier of the target device of the data to be transmitted is obtained by parsing the data to be transmitted sent from the source device; the optimal path from the gateway to the target device is queried from the preset routing table according to the identifier of the target device; the data to be transmitted and the optimal path are sent to the relay device connected to the gateway on the optimal path, so that the relay device transmits the data to be transmitted to the target device based on the optimal path, then it is realized that the routing table is stored in the gateway, and according to the optimal path in the routing table, the data to be transmitted is transmitted to the target device via the optimal path, thus improving the transmission efficiency of the data to be transmitted.

Further, the amount of stored data of the relay device is reduced, and the relay device can acquire the optimal path without querying the routing table, thereby reducing the processing load of the relay device.

BRIEF DESCRIPTION OF DRAWINGS

In order to more clearly illustrate technical solutions of embodiments of the present disclosure, accompanying drawings which need to be used in the embodiments will be introduced briefly below. It should be understood that the accompanying drawings below merely show some embodiments of the present disclosure, therefore, they should not be considered as limitation to the scope, and a person ordinarily skilled in the art still could obtain other relevant drawings according to these accompanying drawings, without using inventive efforts.

Reference signs: 101—source device; 102—gateway; 103—relay device; 104—target device; 501—parsing module; 502—querying module; 503—sending module; 504—determining module; 505—establishing module; 506—updating module; 601—processor; 602—memory.

DETAILED DESCRIPTION OF EMBODIMENTS

In order to make objectives, technical solutions and advantages of the embodiments of the present disclosure clearer, the technical solutions in the embodiments of the present disclosure will be described clearly and completely below in conjunction with accompanying drawings in the embodiments of the present disclosure, and apparently, the embodiments described are some but not all embodiments of the present disclosure. Generally, components in the embodiments of the present disclosure, as described and shown in the accompanying drawings herein, may be arranged and designed in various different configurations.

Therefore, the detailed description below of the embodiments of the present disclosure provided in the accompanying drawings is not intended to limit the scope of the present disclosure claimed, but merely illustrates chosen embodiments of the present disclosure. All of other embodiments obtained by those ordinarily skilled in the art based on the embodiments of the present disclosure without using any creative efforts shall fall within the scope of protection of the present disclosure.

It should be noted that similar reference signs and letters represent similar items in the following accompanying drawings, therefore, once a certain item is defined in one accompanying drawing, it is not needed to be further defined or explained in subsequent accompanying drawings.

In the description of the present disclosure, it should be indicated that terms such as "first", "second", and "third" are merely for distinctive description, but should not be construed as indicating or implying importance in the relativity.

Figure 1:
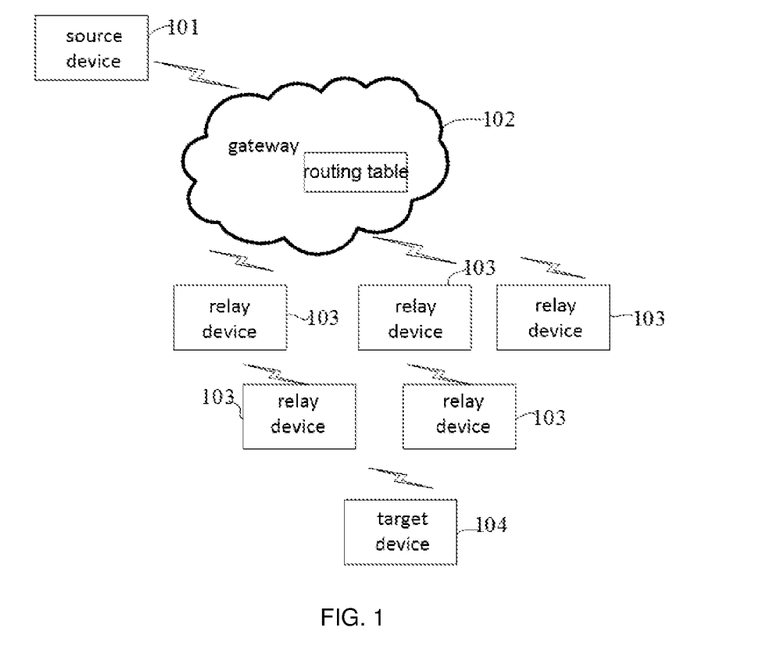
FIG. 1 is a structural schematic view of a data transmission system for Mesh network provided in an embodiment of the present disclosure.

FIG. 1 is a structural schematic view of a data transmission system for Mesh network provided in an embodiment of the present disclosure, and referring to FIG. 1, the data transmission system for Mesh network includes: a source device 101, a gateway 102, a plurality of relay devices 103 and a target device 104, wherein the source device 101 is connected to the gateway 102, and the relay devices 103 are connected to the gateway 102 and the target device 104, respectively.

The source device 101 sends data to be transmitted to the gateway 102, the gateway 102 sends the data to be transmitted to the relay device 103 according to an optimal path stored in a preset routing table, and the relay device 103 transmits the data to be transmitted to the target device 104 according to the optimal path.

Figure 2:
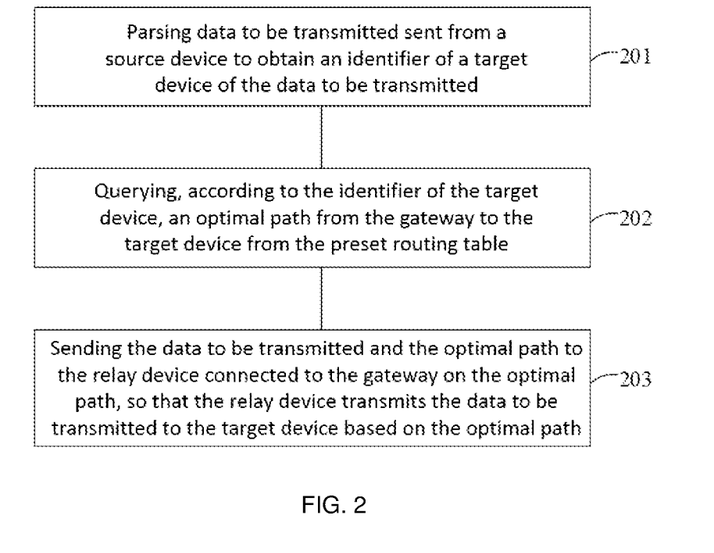
FIG. 2 is a schematic flow chart of a data transmission method for Mesh network provided in an embodiment of the present disclosure.

FIG. 2 is a schematic flow chart of a data transmission method for Mesh network provided in an embodiment of the present disclosure. It should be configured as a gateway 102 in the above data transmission system for Mesh network. As shown in FIG. 2, the method includes:

Step 201, parsing data to be transmitted sent from a source device 101 to obtain an identifier of a target device 104 of the data to be transmitted.

It should be noted that, the source device 101 may include devices such as a voice device and a mobile terminal; the data to be transmitted may include data such as voice data and text data; and the identifier of the target device 104 of the data to be transmitted may include identifiers such as name, address, and serial number of the target device 104 of the data to be transmitted, and the identifier of the target device 104 may be set according to different application scenarios, which is not limited in the embodiment of the present disclosure.

For example, the gateway 102 acquires the data to be transmitted sent by the source device 101, parses the data to be transmitted, and extracts the identifier of the target device 104 in the data to be transmitted, so that the data to be transmitted is transmitted to the target device 104 in subsequent steps.

Step 202, querying, according to the identifier of the target device 104, an optimal path from the gateway 102 to the target device 104 from the preset routing table.

In the above, the preset routing table includes the optimal path from the gateway 102 to at least one data receiving device.

The gateway 102 searches for the identifier of the target device 104 in the preset routing table according to the identifier of the target device 104, wherein if the identifier of the target device 104 exists in the preset routing table, the gateway 102 may query the optimal path of transmitting data from the gateway 102 to the routing table from the routing table.

Step 203, sending the data to be transmitted and the optimal path to the relay device 103 connected to the gateway 102 on the optimal path, so that the relay device 103 transmits the data to be transmitted to the target device 104 based on the optimal path.

After the optimal path from the gateway 102 to the target device 104 is acquired, the data to be transmitted and the optimal path are sent to the relay device 103 connected to the gateway 102 on the optimal path, and the relay device 103 may transmit the data to be transmitted to the target device 104 according to the optimal path and information to be transmitted.

For example, the gateway 102 is denoted as A, the target device 104 is denoted as E, to transmit the data to be transmitted from A to E, a plurality of relay devices 103 in the optimal path between A and E need to transfer the data to be transmitted, and each relay device 103 may transmit the data to be transmitted to the target device 104 according to the optimal path.

In summary, the embodiment of the present disclosure provides a data transmission method for Mesh network, wherein the identifier of the target device 104 of the data to be transmitted is obtained by parsing the data to be transmitted sent from the source device 101; the optimal path from the gateway 102 to the target device 104 is queried from the preset routing table according to the identifier of the target device 104; the data to be transmitted and the optimal path are sent to the relay device 103 connected to the gateway 102 on the optimal path, so that the relay device 103 transmits the data to be transmitted to the target device 104 based on the optimal path, then it is realized that the routing table is stored in the gateway 102, and according to the optimal path in the routing table, the data to be transmitted is transmitted to the target device 104 via the optimal path, thus improving the transmission efficiency of the data to be transmitted.

Further, the amount of stored data of the relay device 103 is reduced, and the relay device 103 can acquire the optimal path without querying the routing table, thereby reducing the processing load of the relay device 103.

Figure 3:
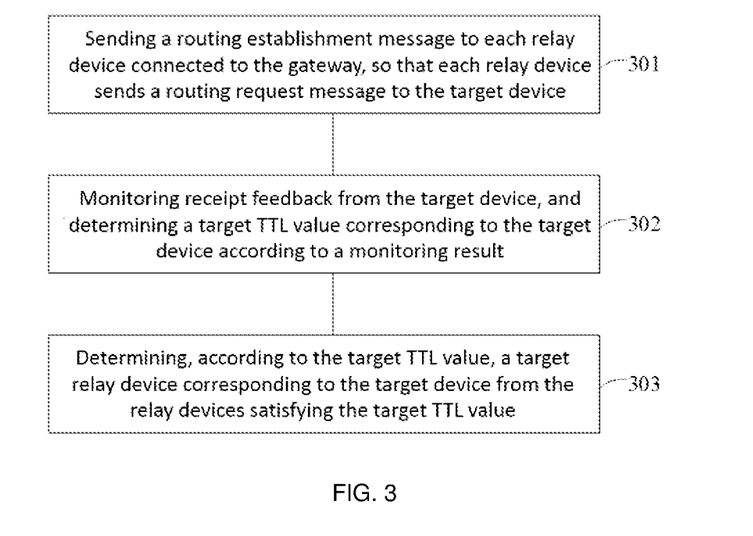
FIG. 3 is a schematic flow chart of another data transmission method for Mesh network provided in an embodiment of the present disclosure.

FIG. 3 is a schematic flow chart of another data transmission method for Mesh network provided in an embodiment of the present disclosure; and as shown in FIG. 3, prior to the above step 202, the method includes:

Step 301, sending a routing establishment message to each relay device 103 connected to the gateway 102, so that each relay device 103 sends a routing request message to the target device 104.

The routing establishment message is sent to each relay device 103 among the respective relay devices 103 connected to the gateway 102, and after receiving the routing establishment message sent by the gateway 102, each relay device 103 may continue to transfer the routing establishment message until the target device 104 receives the routing request message.

For example, the gateway 102 is denoted as A1, and the target device 104 is denoted as A10, there are 8 relay devices 103 between A1 and A10, the relay devices 103 connected to the gateway 102 are A2, A3, A4 and A5, after the gateway 102 sends the routing establishment message, the relay devices 103 (A2, A3, A4, A5) connected to the gateway 102, after receiving the routing establishment message, may transfer the routing establishment message to other relay devices 103 until the target device 104 receives the routing establishment message.

Step 302, monitoring receipt feedback from the target device 104, and determining a target TTL value corresponding to the target device 104 according to a monitoring result.

In the above, the TTL (Time To Live) refers to the number of times of transferring the routing establishment message from the gateway 102 sending the routing establishment message until the target device 104 receives the routing establishment message.

For example, the gateway 102 is denoted as A1, the target device 104 is denoted as A10, there are 8 relay devices 103 between A1 and A10, and when the target device 104 receives the routing establishment message, the routing establishment message has been transferred 4 times, then the target TTL value is 4.

Step 303, determining, according to the target TTL value, a target relay device corresponding to the target device 104 from the relay devices 103 satisfying the target TTL value.

It should be noted that, when the target TTL value is fixed, the number of times of transferring the routing establishment message has been determined. As there are a plurality of relay devices 103 between the gateway 102 and the target device 104, when the number of times of transferring the routing establishment message is fixed, there are a plurality of paths via which the routing establishment message may be transmitted to the target device 104.

For example, when the target TTL value is 4, the gateway 102 is denoted as A, the target device 104 is denoted as A8, and when the number of times of transferring the routing establishment message between A1 and A8 is fixed, A2, A3, A4, A5, A6 and A7 are relay devices 103, there are a plurality of paths for transmitting the routing establishment message from the gateway 102 to the target device 104, A1-A2-A4-A6-A8, A1-A3-A5-A7-A8; then, selection may be made from the relay devices 103 satisfying the target TTL value to determine the target relay device corresponding to A8.

Step 304, establishing, according to the target relay device, the optimal path from the gateway 102 to the target device 104.

Specifically, the transmission path from the gateway 102 to the target device 104 may be determined according to the target relay device, and the transmission path from the gateway 102 to the target is determined as the optimal path from the gateway 102 to the target device 104.

For example, continuing with the above example, if it is determined that A2, A4, and A6 are the target relay devices, A1-A2-A4-A6-A8 is the optimal path from the gateway 102 to the target device 104.

In an optional embodiment, the above sending a routing establishment message to each relay device 103 connected to the gateway 102 includes: sending the routing establishment message to each relay device 103 connected to the gateway 102 according to a preset Time To Live TTL value.

In the above, the preset Time To Live TTL value refers to the number of times of transferring the routing establishment message when the target device 104 receives the routing establishment message. The preset Time To Live TTL value may start from 1, and if the preset TTL value is 1, the target device 104 may receive the routing establishment message, indicating that no relay device 103 is needed between the gateway 102 and the target device 104, and the routing establishment message may be directly transmitted.

Figure 4:
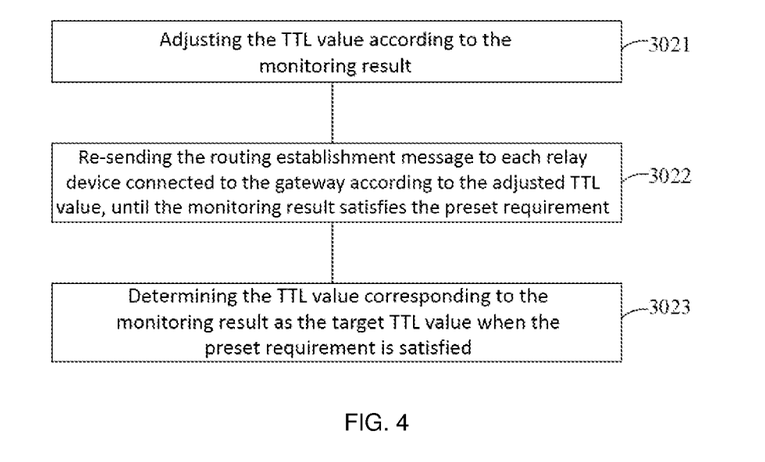
FIG. 4 is a specific schematic flow chart of S302 in FIG. 3.

FIG. 4 is a specific schematic flow chart of S302 in FIG. 3; and as shown in FIG. 4, the above step 302 includes following steps.

Step 3021: adjusting the TTL value according to the monitoring result.

Specifically, the gateway 102 may adjust the TTL value according to the monitoring result, according to the monitored receipt feedback of the target device 104, wherein if the gateway 102 detects the receipt feedback sent by the target device 104, the monitoring result indicates that the target device 104 may receive the routing establishment message, and if the gateway 102 does not receive the feedback sent by the target device 104, the monitoring result indicates that the target device 104 does not receive the routing establishment message, then the TTL value needs to be adjusted.

For example, if the preset TTL value is 1, and the target device 104 does not receive the routing establishment message, it indicates that the relay device 103 is needed between the gateway 102 and the target device 104 to transfer the routing establishment message, then the TTL value needs to be adjusted, and after the TTL value is adjusted to 2, it is judged again whether the target device 104 receives the routing establishment message.

Step 3022, re-sending the routing establishment message to each relay device 103 connected to the gateway 102 according to the adjusted TTL value, until the monitoring result satisfies the preset requirement.

In the above, the preset requirement refers to that the receipt feedback from the target device 104 is received.

Specifically, when the preset TTL value cannot enable the target device 104 to receive the routing establishment message sent by the gateway 102, the TTL value is adjusted, and the gateway 102 re-sends the routing establishment message to each relay device 103 connected to the gateway 102, and judges whether the adjusted TTL value satisfies the preset requirement, and if not, the TTL value is adjusted continuously until the monitoring result satisfies the preset requirement.

Step 3023, determining the TTL value corresponding to the monitoring result as the target TTL value when the preset requirement is satisfied.

In the above, if the adjusted TTL value enables the target device 104 to receive the routing establishment message, the TTL value satisfying the preset requirement is determined as the target TTL value.

For example, if the adjusted TTL value is 4, and the target device 104 may receive the routing establishment message when the TTL value is 4, it indicates that the routing establishment message needs to be transferred 4 times in the process of sending the routing establishment message from the gateway 102 to the target device 104, and 4 is determined as the target TTL value.

In an optional embodiment, the preset Time To Live TTL value is a preset minimum TTL value; and the TTL value is adjusted according to the monitoring result, including: increasing the TTL value according to a preset amplitude of adjustment if the monitoring result indicates that the receipt feedback from the target device 104 is not received.

In the above, the preset requirement is that the receipt feedback from the target device 104 is received, the preset minimum TTL value may be 1, and the amplitude of adjustment also may be 1.

For example, when the preset TTL value is 1, and the target device 104 does not receive the routing establishment message, it indicates that the relay device 103 is needed between the gateway 102 and the target device 104 to transfer the routing establishment message, then the TTL value needs to be adjusted. The TTL value may be adjusted to 2, and it is judged whether the target device 104 receives the routing establishment message, if the target device 104 does not receive the routing establishment message, the TTL value needs to be adjusted to 3, until the adjusted TTL value enables the target device 104 to receive the routing establishment message, and the gateway 102 may receive the receipt feedback from the target device 104.

It should be noted that, in the embodiment of the present disclosure, the minimum TTL is 1, and the amplitude of adjustment is 1, but they are not limited thereto, and the amplitude of adjustment and the minimum TTL value further may be specifically set according to practical application.

In an optional embodiment, the preset Time To Live TTL value is a preset maximum TTL value; and the TTL value is adjusted according to the monitoring result, including: decreasing the TTL value according to a preset amplitude of adjustment if the monitoring result indicates that the receipt feedback from the target device 104 is received.

In the above, the preset requirement is that the receipt feedback from the target device 104 is not received, the maximum TTL value may be 6, and the amplitude of adjustment may be 1.

For example, when the TTL value is 6, if the target device 104 receives the routing establishment message, and the gateway 102 receives the receipt feedback from the target device 104, the TTL value may be adjusted to 5, if the gateway 102 may receive the receipt feedback from the target device 104, the TTL may be adjusted to 4, if the LLT value is adjusted to 4, the gateway 102 cannot receive the receipt feedback from the target device 104, then "5" may be set as the target TTL value.

Figure 5:
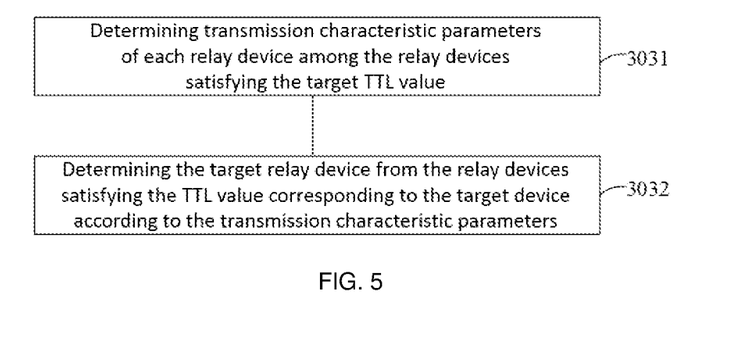
FIG. 5 is a specific schematic flow chart of S303 in FIG. 3.

FIG. 5 is a specific schematic flow chart of S303 in FIG. 3; and as shown in FIG. 5, the above step 303 includes following steps.

Step 3031, determining transmission characteristic parameters of each relay device 103 among the relay devices 103 satisfying the target TTL value.

In the above, the transmission characteristic parameters include: a received signal strength indication (RSSI) value and/or a transmission delay to the target device 104, wherein RSSI refers to strength indication of data received by a device, and the transmission delay to the target device 104 refers to a time delay caused by factors such as environment for data transmission and RSSI of the device when the TTL value is fixed.

For example, when the target TTL value is 4, the gateway 102 is denoted as A, the target device 104 is denoted as A8, and when the number of times of transferring the routing establishment message between A1 and A8 is fixed, A2, A3, A4, A5, A6 and A7 are relay devices 103, paths transmitting the routing establishment message from the gateway 102 to the target device 104 may be path 1=A1-A2-A4-A6-A8, path 2=A1-A3-A5-A7-A8, path 3=A1-A2-A5-A7-A8, path 4=A1-A3-A5-A6-A8, path 5=A1-A3-A4-A6-A8 and so on, and when the TTL values are the same, in order to screen out the optimal path, the screening may be performed according to the transmission characteristic parameters of each relay device 103 in the plurality of paths.

Continuing with the above example, for example, if the received signal strength of A3 is stronger than that of A2, A3 may be selected as the relay device 103; if the received signal strength of A4 is stronger than that of A5, A4 may be selected as the relay device 103, and if the received signal strength of A6 is stronger than that of A7, A6 may be selected as the relay device 103, and thus the optimal path is A1-A3-A4-A6-A8.

Step 3032, determining the target relay device from the relay devices 103 satisfying the TTL value corresponding to the target device 104 according to the transmission characteristic parameters.

The target relay device is determined from the relay devices 103 satisfying the TTL value corresponding to the target device 104 according to the transmission characteristic parameters of each relay device 103.

The screening is performed according to the received signal strength of the transmission characteristic parameters of each relay device 103, for example, if the received signal strength of A3 is stronger than that of A2, A3 may be selected as the relay device 103; if the received signal strength of A4 is stronger than that of A5, A4 may be selected as the relay device 103, and if the received signal strength of A6 is stronger than that of A7, A6 may be selected as the relay device 103, and thus the optimal path is A1-A3-A4-A6-A8.

If two relay devices 103 have the same received signal strength, the time of transmitting data via the paths formed by different relay devices 103 having the same TTL value may be compared, wherein if path 1 is A1-A2-A3-A4, and path 2 is A1-A5-A6-A4, the duration between the time when the gateway 102 sends the routing establishment message via the path 1 or the path 2 and the time when the target device 104 receives the routing establishment message may be compared, and the path with a shorter duration is selected as the optimal path.

It should be noted that the target TTL value refers to the number of times of transferring the routing establishment message, and when the target TTL value is fixed, the target relay device needs to be selected from the relay devices 103 with the same TTL value. For example, the TTL value of the relay device 103 that transfers the routing establishment message to the target device 104 at the last time is the target TTL value plus 1, and the previous relay device 103 is incremented by 1 in sequence. For example, when A1 is the gateway 102, A8 is the target device 104, and the target TTL value is 4, there are two paths, path 1=A1-A3-A4-A6-A8 and path 2=A1-A2-A4-A6-A8, respectively, the TTL value of A6, a relay device 103, is 1, the TTL value of A4 is 2, the TTL values of A2 and A3 are 3, where the TTL values of A2, A4, and A6 merely refer to the TTL values in the path from A1 to A8. When the target relay device is determined according to the received signal strength among the transmission characteristic parameters, the relay devices 103 with the same TTL value between the gateway A1 and the target device A8 need to be compared, for example, the TTL values of A2 and A3 are both 3, the received signal strength of A2 and A3 may be compared, and the device with the highest received signal strength is selected as a target relay device.

Figure 6:
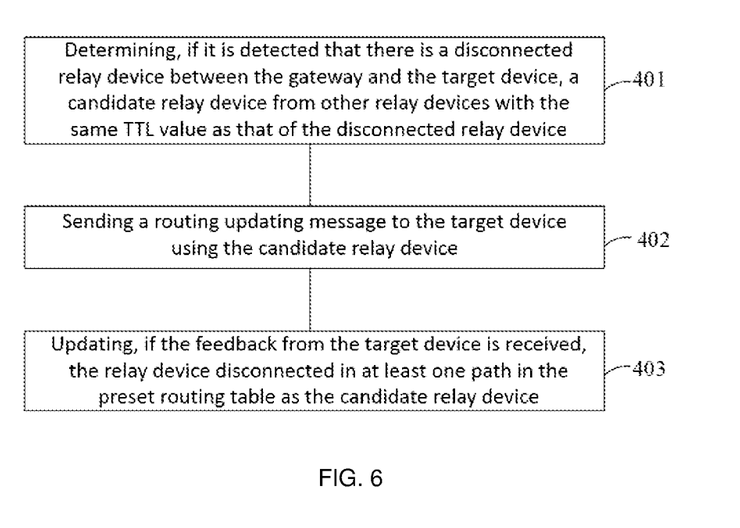
FIG. 6 is a schematic flow chart of another data transmission method for Mesh network provided in an embodiment of the present disclosure.

FIG. 6 is a schematic flow chart of another data transmission method for Mesh network provided in an embodiment of the present disclosure; and as shown in FIG. 5, the method further includes following steps.

Step 401, determining, if it is detected that there is a disconnected relay device 103 between the gateway 102 and the target device 104, a candidate relay device from other relay devices 103 with the same TTL value as that of the disconnected relay device 103.

If the gateway 102 detects that there is a disconnected relay device 103 between the gateway 102 and the target device 104, it is indicated that a certain relay device between the gateway 102 and the target device 104 fails, then the candidate relay device is determined from other relay devices 103 with the same TTL value as that of the disconnected relay device 103. In the above, whether the relay device 103 is disconnected may be judged by detecting heartbeat of the relay device 103, wherein if the heartbeat of the relay device 103 is detected by the gateway 102, it indicates that the relay device 103 does not fail, and if no heartbeat of the relay device 103 is detected by the gateway 102, it indicates that the relay device 103 is disconnected.

For example, if A4 in the path A1-A2-A4-A6-A8 is disconnected, and if the target TTL value is 4, the TTL value of A4 may be 2, at this time, the data to be transmitted cannot be transmitted to the target device 104 via the path A1-A2-A4-A6-A8, and the candidate relay device 103 may be selected from the relay devices 103 with the TTL value being able to be 2 in the paths between A1 and A8.

It should be noted that, the candidate relay device 103 may be selected according to comparison of the transmission characteristic parameters of respective relay devices 103.

Step 402, sending a routing updating message to the target device 104 using the candidate relay device.

Specifically, the gateway 102 sends the routing updating message to the target device 104 through the candidate relay device, so as to judge whether the relay device 103 can transmit the routing updating message to the target device 104.

Step 403, updating, if the feedback from the target device 104 is received, the disconnected relay device 103 in at least one path in the preset routing table as the candidate relay device.

It should be noted that, the candidate device may serve as the relay device 103 when other target devices 104 receive data, and therefore, when the candidate device is disconnected, the disconnected relay device 103 in at least one path in the routing table needs to be updated as the candidate relay device.

By updating the disconnected relay device 103 as the candidate relay device in time, it is avoided that the gateway 102 fails to transmit the data to the target device 104 and the data transmission is affected, caused by the disconnection of the relay device 103, thus further optimizing the path, and improving the transmission efficiency of data.

Further, by updating the routing table in the gateway 102, it is unnecessary to update the routing table stored in the relay device 103 in the prior art, thus reducing the workload of the relay device 103.

Figure 7:
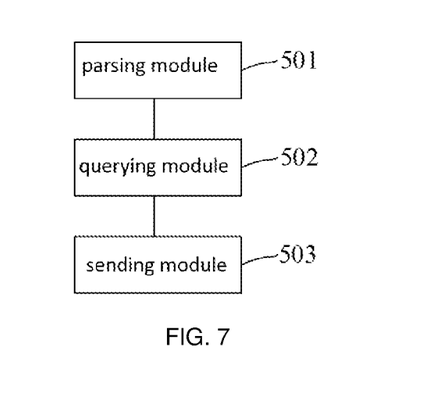
FIG. 7 is a structural schematic view of a data transmission apparatus for Mesh network provided in an embodiment of the present disclosure.

FIG. 7 is a structural schematic view of a data transmission apparatus for Mesh network provided in an embodiment of the present disclosure, and the apparatus includes:

a parsing module 501, configured to parse data to be transmitted sent from a source device 101 to obtain an identifier of a target device 104 of the data to be transmitted;

a querying module 502, configured to query, according to the identifier of the target device 104, an optimal path from a gateway 102 to the target device 104 from a preset routing table, wherein the preset routing table includes the optimal path from the gateway 102 to at least one data receiving device; and a sending module 503, configured to send the data to be transmitted and the optimal path to the relay device 103 connected to the gateway 102 on the optimal path, so that the relay device 103 transmits the data to be transmitted to the target device 104 based on the optimal path.

In an optional embodiment, the sending module 503 is further configured to send a routing establishment message to each relay device 103 connected to the gateway 102, so that each relay device 103 sends a routing request message to the target device 104.

Figure 8:
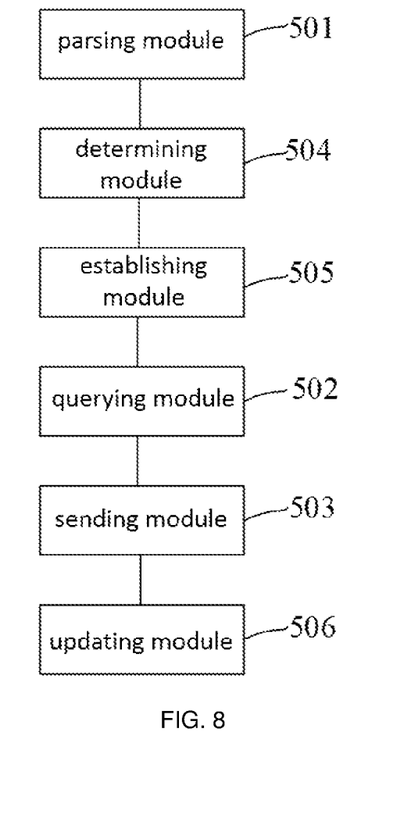
FIG. 8 is a structural schematic view of another data transmission apparatus for Mesh network provided in an embodiment of the present disclosure.

Referring to FIG. 8, the apparatus further includes:

a determining module 504, configured to monitor receipt feedback from the target device 104, and determine a target TTL value corresponding to the target device 104 according to a monitoring result; and determine, according to the target TTL value, a target relay device 103 corresponding to the target device 104 from the relay devices 103 satisfying the target TTL value; and an establishing module 505, configured to establish, according to the target relay device 103, the optimal path from the gateway 102 to the target device 104.

In an optional embodiment, the sending module 503 is further configured to send a routing establishment message to each relay device 103 connected to the gateway 102 according to a preset Time To Live TTL value.

The determining module 504 is specifically configured to adjust the TTL value according to the monitoring result; and re-send the routing establishment message to each relay device 103 connected to the gateway 102 according to the adjusted TTL value until the monitoring result satisfies the preset requirement; and determine the TTL value corresponding to the monitoring result as the target TTL value when the preset requirement is satisfied.

In an optional embodiment, the determining module 504 is specifically configured to increase the TTL value according to a preset amplitude of adjustment if the monitoring result indicates that the receipt feedback from the target device 104 is not received, wherein the preset requirement is that the receipt feedback from the target device 104 is received.

In an optional embodiment, the determining module 504 is specifically configured to decrease the TTL value according to the preset amplitude of adjustment, if the monitoring result indicates that the receipt feedback from the target device 104 is received, wherein the preset requirement is that the receipt feedback from the target device 104 is not received.

In an optional embodiment, the determining module 504 is specifically configured to determine transmission characteristic parameters of each relay device 103 among the relay devices 103 satisfying the target TTL value; and determine the target relay device 103 from the relay devices 103 satisfying the TTL value corresponding to the target device 104 according to the transmission characteristic parameters.

In an optional embodiment, the transmission characteristic parameters include: a received signal strength indication RSSI value and/or a transmission delay to the target device 104.

In an optional embodiment, the determining module is configured to determine, from the relay devices satisfying the TTL value corresponding to the target device, the relay device having the highest received signal strength indication RSSI value as the target relay device.

In an optional embodiment, the determining module is configured to determine, from the relay devices satisfying the TTL value corresponding to the target device, the relay device having the shortest transmission delay to the target device as the target relay device, if the received signal strength indication RSSI values of the relay devices satisfying the TTL value corresponding to the target device are equal.

In an optional embodiment, the determining module 504 is further configured to determine, if it is detected that there is a disconnected relay device 103 between the gateway 102 and the target device 104, a candidate relay device 103 from other relay devices 103 with the same TTL value as that of the disconnected relay device 103.

In an optional embodiment, the determining module is further configured to detect heartbeat of the relay device.

The determining module is further configured to determine that there is a disconnected relay device between the gateway and the target device if no heartbeat of the relay device is detected.

The sending module 503 is further configured to send a routing updating message to the target device 104 using the candidate relay device 103.

The apparatus further includes:

an updating module 506, configured to update, if the feedback from the target device 104 is received, the disconnected relay device 103 in at least one path in the preset routing table as the candidate relay device 103.

The above apparatus is configured to execute the method provided in the foregoing embodiment, and its implementation principle and technical effects are similar, and are not described herein again.

The above modules may be one or more integrated circuits configured to implement the above method, for example, one or more Application Specific Integrated Circuits (ASIC for short), or one or more Digital Signal Processors (DSP for short), or one or more Field Programmable Gate Arrays (FPGA for short), etc. For another example, when a certain module above is implemented in the form of a processing element scheduling program code, the processing element may be a general purpose processor, for example, a Central Processing Unit (CPU for short) or other processors that can invoke the program code. For another example, these modules may be integrated together and implemented in the form of a system-on-a-chip (SOC for short).

Figure 9:
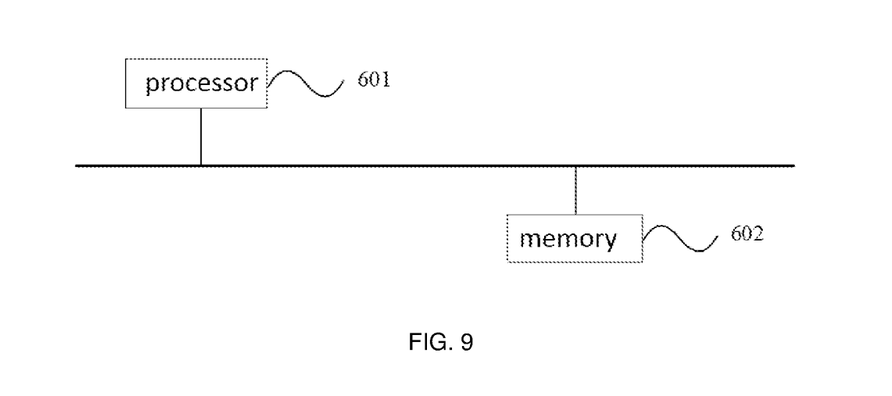
FIG. 9 is a structural schematic view of a gateway provided in an embodiment of the present disclosure.

FIG. 9 is a structural schematic view of the gateway 102 provided in an embodiment of the present disclosure, and the gateway 102 includes: a memory 602 and a processor 601, the memory 602 and the processor 601 being connected through a bus.

The memory 602 is configured to store a program, and the processor 601 invokes the program stored in the memory 602 to execute the above method embodiment. Specific implementation modes and technical effects are similar, and are not described herein again.

Optionally, the present disclosure further provides a program product, for example, a computer readable storage medium, including a program, which when executed by a processor is configured to execute the above method embodiment.

It should be understood that in the several embodiments provided in the present disclosure, the apparatus and the method disclosed may be implemented in other manners. For example, the apparatus embodiment described in the above is merely exemplary, for example, the units are merely divided according to logical functions, but they may be divided in other manners in practical implementation, for example, multiple units or components may be combined or may be integrated into another system, or some features may be omitted, or not executed. In addition, mutual couplings or direct couplings or communicative connections as shown or discussed may be indirect couplings or communicative connections via some communication interfaces, means or units, and may be in an electrical form, a mechanical form or other forms.

The units described as separate parts may be or also may not be physically separated, the parts displayed as units may be or also may not be physical units, i.e., they may be located at one place, or also may be distributed on a plurality of network units. The objective of the solution of the present embodiment may be realized by selecting part or all of the units thereof as actually required.

Besides, various functional units in various embodiments of the present disclosure may be integrated into one processing unit, or each unit also may exist in a physically independent way, or two or more than two units also may be integrated into one unit. The above integrated unit may be implemented in the form of hardware, or in the form of hardware plus a software functional unit.

The above integrated unit implemented in a form of software functional unit may be stored in one computer readable storage medium. The above software functional unit is stored in one storage medium, including several instructions used to make one computer device (which can be a personal computer, a sever or a network device etc.) execute all or some of the steps of the methods of various embodiments of the present disclosure. The aforementioned storage medium includes various media in which program codes can be stored, such as U disk, mobile hard disk, Read-Only Memory (ROM for short), Random Access Memory (RAM for short), diskette and compact disk.

The above-mentioned are merely specific embodiments of the present disclosure, but the scope of protection of the present disclosure is not limited thereto, and any modification or substitution that may be easily envisaged by those skilled in the present art within the technical scope disclosed in the present disclosure should fall within the scope of protection of the present disclosure. Therefore, the scope of protection of the present disclosure should be determined by the scope of protection of the claims.

The above-mentioned are merely for preferred embodiments of the present disclosure but are not configured to limit the present disclosure. For one skilled in the art, various modifications and changes may be made to the present disclosure. Any amendments, equivalent replacements, improvements, and so on, within the spirit and principle of the present disclosure, should be covered by the scope of protection of the present disclosure.

INDUSTRIAL APPLICABILITY

The present disclosure provides a data transmission method for Mesh network, a data transmission apparatus for Mesh network, a gateway and a storage medium, and it is realized that the routing table is stored by the gateway, and the data to be transmitted is transmitted to the target device via the optimal path according to the optimal path in the routing table, thus improving the transmission efficiency of the data to be transmitted.

What is claimed is:

1. A data transmission method for Mesh network, wherein the method comprises:

parsing data to be transmitted sent from a source device, to obtain an identifier of a target device of the data to be transmitted;

querying, from a preset routing table stored in a gateway, according to the identifier of the target device, an optimal path from a gateway to the target device, wherein the preset routing table comprises an optimal path from the gateway to at least one data receiving device, wherein the optimal path comprises a number of relay devices between the gateway device and the target device for data transferring; and sending the data to be transmitted and the optimal path to each of the relay devices identified in the optimal path and connected to the gateway on the optimal path, so that the relay devices transmit the data to be transmitted to the target device based on the optimal path;

wherein before the querying, from a preset routing table, according to the identifier of the target device, an optimal path from a gateway to the target device, the method further comprises:

sending a routing establishment message to each of the relay devices connected to the gateway, so that each of the relay devices sends a routing request message to the target device;

monitoring receipt feedback from the target device, and determining a target TTL value corresponding to the target device according to a monitoring result;

determining, according to the target TTL value, a target relay device corresponding to the target device, from the relay devices satisfying the target TTL value; and establishing, according to the target relay device, the optimal path from the gateway to the target device;

wherein the sending a routing establishment message to each of the relay devices connected to the gateway comprises:

sending the routing establishment message to each of the relay devices connected to the gateway according to a preset Time To Live TTL value; and the monitoring receipt feedback from the target device, and determining a target TTL value corresponding to the target device according to a monitoring result comprises:

adjusting a TTL value according to the monitoring result;

re-sending the routing establishment message to each of the relay devices connected to the gateway according to an adjusted TTL value, until the monitoring result satisfies a preset requirement; and determining a TTL value corresponding to the monitoring result as the target TTL value when the preset requirement is satisfied;

wherein the preset Time To Live TTL value is a preset minimum TTL value; and the adjusting a TTL value according to the monitoring result comprises:

increasing the TTL value according to a preset amplitude of adjustment, if the monitoring result indicates that the receipt feedback from the target device is not received, wherein the preset requirement is satisfied when the receipt feedback from the target device is received;

wherein the preset Time To Live TTL value is a preset maximum TTL value; and the adjusting a TTL value according to the monitoring result comprises:

decreasing the TTL value according to a preset amplitude of adjustment, if the monitoring result indicates that the receipt feedback from the target device is received, wherein the preset requirement is satisfied when the receipt feedback from the target device is not received.

2. The method according to claim 1, wherein the determining, according to the target TTL value, a target relay device corresponding to the target device from the relay devices satisfying the target TTL value comprises:

determining transmission characteristic parameters of each relay device among the relay devices satisfying the target TTL value; and determining the target relay device from the relay devices satisfying a TTL value corresponding to the target device according to the transmission characteristic parameters.

3. The method according to claim 2, wherein the transmission characteristic parameters comprise: a received signal strength indication RSSI value and/or a transmission delay to the target device.

4. The method according to claim 3, wherein the determining the target relay device from the relay devices satisfying a TTL value corresponding to the target device according to the transmission characteristic parameters comprises:

determining, as the target relay device, from the relay devices satisfying the TTL value corresponding to the target device, a relay device having a highest received signal strength indication RSSI value.

5. The method according to claim 3, wherein the determining the target relay device from the relay devices satisfying a TTL value corresponding to the target device according to the transmission characteristic parameters comprises:

determining, as the target relay device, from the relay devices satisfying the TTL value corresponding to the target device, a relay device having a shortest transmission delay to the target device, if received signal strength indication RSSI values of the relay devices satisfying the TTL value corresponding to the target device are equal to each other.

6. The method according to claim 1, wherein the method further comprises:

determining, if a disconnected relay device is detected between the gateway and the target device, a candidate relay device from other relay devices with the TTL value same as that of the disconnected relay device;

sending a routing updating message to the target device using the candidate relay device; and updating, if a feedback from the target device is received, the disconnected relay device in at least one path in the preset routing table to be the candidate relay device.

7. The method according to claim 6, wherein before the determining, if a disconnected relay device is detected between the gateway and the target device, a candidate relay device from other relay devices with the TTL value same as that of the disconnected relay device, the method further comprises:

detecting a heartbeat of a relay device; and determining that the disconnected relay device exists between the gateway and the target device, if no heartbeat of the relay device is detected.

8. The method according to claim 1, wherein the determining, according to the target TTL value, a target relay device corresponding to the target device from the relay devices satisfying the target TTL value comprises:

determining transmission characteristic parameters of each relay device among the relay devices satisfying the target TTL value; and determining the target relay device from the relay devices satisfying a TTL value corresponding to the target device according to the transmission characteristic parameters.

9. The method according to claim 1, wherein the determining, according to the target TTL value, a target relay device corresponding to the target device from the relay devices satisfying the target TTL value comprises:

determining transmission characteristic parameters of each relay device among the relay devices satisfying the target TTL value; and determining the target relay device from the relay devices satisfying a TTL value corresponding to the target device according to the transmission characteristic parameters.

10. The method according to claim 1, wherein the determining, according to the target TTL value, a target relay device corresponding to the target device from the relay devices satisfying the target TTL value comprises:

determining transmission characteristic parameters of each relay device among the relay devices satisfying the target TTL value; and determining the target relay device from the relay devices satisfying a TTL value corresponding to the target device according to the transmission characteristic parameters.

11. The method according to claim 1, wherein the method further comprises:

determining, if a disconnected relay device is detected between the gateway and the target device, a candidate relay device from other relay devices with the TTL value same as that of the disconnected relay device;

sending a routing updating message to the target device using the candidate relay device; and updating, if a feedback from the target device is received, the disconnected relay device in at least one path in the preset routing table to be the candidate relay device.

12. The method according to claim 1, wherein the method further comprises:

determining, if a disconnected relay device is detected between the gateway and the target device, a candidate relay device from other relay devices with the TTL value same as that of the disconnected relay device;

sending a routing updating message to the target device using the candidate relay device; and updating, if a feedback from the target device is received, the disconnected relay device in at least one path in the preset routing table to be the candidate relay device.

13. The method according to claim 1, wherein the method further comprises:

determining, if a disconnected relay device is detected between the gateway and the target device, a candidate relay device from other relay devices with the TTL value same as that of the disconnected relay device;

sending a routing updating message to the target device using the candidate relay device; and updating, if a feedback from the target device is received, the disconnected relay device in at least one path in the preset routing table to be the candidate relay device.

14. The method according to claim 1, wherein the method further comprises:

determining, if a disconnected relay device is detected between the gateway and the target device, a candidate relay device from other relay devices with the TTL value same as that of the disconnected relay device;

sending a routing updating message to the target device using the candidate relay device; and updating, if a feedback from the target device is received, the disconnected relay device in at least one path in the preset routing table to be the candidate relay device.

15. A gateway, comprising a memory and a processor, wherein the memory stores a computer program executable on the processor, and when the processor executes the computer program, steps of the method according to claim 1 are realized.

16. A data transmission apparatus for Mesh network, wherein the apparatus comprises:
one or more processors;
a memory storing a computer-readable code, when the computer-readable code is executed by the data transmission apparatus for Mesh network, the one or more processors execute the following operations, comprising:
parse data to be transmitted sent from a source device, to obtain an identifier of a target device of the data to be transmitted;
query, according to the identifier of the target device, an optimal path from a gateway to the target device from a preset routing table stored in the gateway, wherein the preset routing table comprises an optimal path from the gateway to at least one data receiving device, wherein the optimal path comprises a number of relay devices between the gateway device and the target device for data transferring; and
send the data to be transmitted and the optimal path to each of the relay devices identified in the optimal path and connected to the gateway on the optimal path, so that the relay devices transmit the data to be transmitted to the target device based on the optimal path;
wherein before the querying, from a preset routing table, according to the identifier of the target device, an optimal path from a gateway to the target device, the operations further comprise:
sending a routing establishment message to each of the relay devices connected to the gateway, so that each of the relay devices sends a routing request message to the target device;
monitoring receipt feedback from the target device, and determining a target TTL value corresponding to the target device according to a monitoring result;
determining, according to the target TTL value, a target relay device corresponding to the target device, from the relay devices satisfying the target TTL value; and
establishing, according to the target relay device, the optimal path from the gateway to the target device;
wherein the sending a routing establishment message to each of the relay devices connected to the gateway comprises:
sending the routing establishment message to each of the relay devices connected to the gateway according to a preset Time To Live TTL value; and
the monitoring receipt feedback from the target device, and determining a target TTL value corresponding to the target device according to a monitoring result comprises:
adjusting a TTL value according to the monitoring result;
re-sending the routing establishment message to each of the relay devices connected to the gateway according to an adjusted TTL value, until the monitoring result satisfies a preset requirement; and
determining a TTL value corresponding to the monitoring result as the target TTL value when the preset requirement is satisfied;
wherein the preset Time To Live TTL value is a preset minimum TTL value; and the adjusting a TTL value according to the monitoring result comprises:
increasing the TTL value according to a preset amplitude of adjustment, if the monitoring result indicates that the receipt feedback from the target device is not received,
wherein the preset requirement is satisfied when the receipt feedback from the target device is received;
wherein the preset Time To Live TTL value is a preset maximum TTL value; and the adjusting a TTL value according to the monitoring result comprises:
decreasing the TTL value according to a preset amplitude of adjustment, if the monitoring result indicates that the receipt feedback from the target device is received,
wherein the preset requirement is satisfied when the receipt feedback from the target device is not received.

* * * * *